United States Patent
Becker et al.

(10) Patent No.: US 10,652,617 B2
(45) Date of Patent: May 12, 2020

(54) DIMENSIONAL ISOLATION PREDICTION IN VIDEO DELIVERY SYSTEMS

(71) Applicant: HULU, LLC, Santa Monica, CA (US)

(72) Inventors: Nathan Becker, Los Angeles, CA (US); Colin Zhou, Los Angeles, CA (US); Matthew Holcombe, Los Angeles, CA (US); Atul Arun Phadnis, Duarte, CA (US); Hang Li, Los Angeles, CA (US); Sridhar Srinivasa Subramanian, Culver City, CA (US); Kristen Huff, Los Angeles, CA (US)

(73) Assignee: HULU, LLC, Santa Monica, CA (US)

( * ) Notice: Subject to any disclaimer, the term of this patent is extended or adjusted under 35 U.S.C. 154(b) by 65 days.

(21) Appl. No.: 15/945,675

(22) Filed: Apr. 4, 2018

(65) Prior Publication Data
US 2019/0313155 A1     Oct. 10, 2019

(51) Int. Cl.
| H04N 21/466 | (2011.01) |
| G06N 3/04 | (2006.01) |
| G06N 3/08 | (2006.01) |
| H04N 21/442 | (2011.01) |

(52) U.S. Cl.
CPC .......... *H04N 21/4662* (2013.01); *G06N 3/04* (2013.01); *G06N 3/08* (2013.01); *H04N 21/44213* (2013.01)

(58) Field of Classification Search
CPC ......... H04N 21/4662; H04N 21/44213; G06N 3/04; G06N 3/08
See application file for complete search history.

(56) References Cited

U.S. PATENT DOCUMENTS

| 2011/0131166 A1* | 6/2011 | Li .................... G06N 7/005 706/25 |
| 2013/0159498 A1* | 6/2013 | Funge ................ H04L 65/80 709/224 |
| 2018/0144242 A1* | 5/2018 | Simard ............... G06N 3/084 |

FOREIGN PATENT DOCUMENTS

WO     2014105866 A1     7/2014

OTHER PUBLICATIONS

Ioffe et al., "Batch Normalization: Accelerating Deep Network Training by Reducing Internal Covariate Shift"; Proceedings of the 32nd International Conference on Machine Learning, Lille, France, 2015; (Year: 2015).*

(Continued)

*Primary Examiner* — Alfonso Castro
(74) *Attorney, Agent, or Firm* — Fountainhead Law Group, PC (57) ABSTRACT

In one embodiment, a method separates subscriber features generated from subscriber interaction with a video delivery service into feature dimensions and inputs the feature dimensions into a respective prediction network. Each prediction network is trained to output a respective dimension score. The method outputs dimension scores using parameters in the plurality of prediction networks that are trained using a variance term to control a variance of the plurality of feature dimensions and using a de-correlation term to control a correlation of the plurality of feature dimensions. The dimension scores are combined into a retention prediction score and an action is performed on the video delivery service for the subscriber based on the retention score.

20 Claims, 7 Drawing Sheets

(56) References Cited

OTHER PUBLICATIONS

Hinton et al.: "Improving Neural Networks by Preventing Co-Adaptation of Feature Detectors"; Jul. 3, 2012; 18 pages (Year: 2012).*

Kingma et al.: "Adam: A Method for Stochastic Optimization"; ICLR 2015; 15 pages.

Cogswell et al.: "Reducing Overrating in Deep Networks by Decorrelating Representations"; ICLR 2016; 12 pages.

Hinton et al.: "Improving Neural Networks by Preventing Co-Adaptation of Feature Detectors"; Jul. 3, 2012; 18 pages.

Ioffe et al.: "Batch Normalization: Accelerating Deep Network Training by Reducing Internal Covariate Shift"; Proceedings of the 32nd International Conference on Machine Learning, Lille, France, 2015; 9 pages.

Mishkin et al.: "All You Need is a Good INIT"; ICLR 2016; 13 pages.

Szegedy et al.: "Rethinking the Inception Architecture for Computer Vision"; CVPR 2016; pp. 2818-2826.

Wikipedia—Association Rule Learning; 11 pages; https://en.wikipedia.org/wiki/Association_rule_learning; Apr. 4, 2018.

Wikipedia—Censoring (statistics); 4 pages; https://en.wikipedia.org/wiki/Censoring_(statistics); Apr. 4, 2018.

* cited by examiner

DIMENSIONAL ISOLATION PREDICTION IN VIDEO DELIVERY SYSTEMS

BACKGROUND

For a video delivery service, retention of subscribers is important. The video delivery service may use algorithms that attempt to predict when a user is likely to cancel the service. To make the prediction, the video delivery service may collect multiple characteristics of users that have cancelled the service. Then, the video delivery service uses the user characteristics to identify users with similar characteristics that are currently using the service. When a similarity between a majority of the characteristics is found, the video delivery service may determine that these users may be similarly likely to cancel the service. The video delivery service, however, can only identify users that have a group of characteristics that are similar to the characteristics of users that have cancelled the service.

Once the users have been identified, the video delivery service may want to perform some actions to retain the users. However, the video delivery service only knows that the users have similar characteristics as users that previously quit the service. This generalization of the user characteristics makes it harder to identify what to do to retain the users and prevent the users from cancelling the service.

DETAILED DESCRIPTION

Described herein are techniques for a prediction network. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments generate a retention prediction score for each subscriber of a video delivery service that predicts the retention probability for that subscriber. That is, the retention prediction score predicts a probability of whether or not the subscriber may cancel the service. To provide a more detailed analysis of the probability a subscriber may cancel, the system may isolate user features along different dimensions of features. Prediction networks, such as neural networks, generate dimension scores for each of the dimensions. For example, an individual prediction network generates a dimension score for each dimension. This untangles the impact of the feature dimensions on the retention prediction score and isolates the dimensions, which allows the video delivery service to isolate what symptoms may be causing a subscriber to cancel the service.

The individual scores for each dimension are then combined into the retention prediction score, which predicts an overall retention probability for that subscriber. When the probability that a subscriber might cancel is high, then the use of the individual dimension scores may allow the video delivery service to determine what feature dimensions to improve to try to retain the subscriber. Previously, as described in the Background, the video delivery service would only know that a group of certain user characteristics may be correlated with a high probability that the subscriber would quit the service, but would not have any insight into what user characteristics may be causing users to cancel the service. But because individual dimension scores are used, some embodiments isolate which feature dimensions may be having the most impact on the probability that the subscriber may cancel the service.

The prediction networks are trained to predict the individual dimension scores for each dimension. When subscribers cancel the service, the video delivery service can record the combination of subscriber features, but there is not a direct correlation between one of the feature dimensions and whether the user cancels the service. This means that supervised training of an individual prediction network cannot be performed because the individual dimension score may not be determined from the fact that subscriber cancelled the service. Accordingly, to train the individual networks, a retention score predictor receives the individual dimension scores, and combines them to output a retention prediction score. The retention prediction score is a combined score that can use the result of whether or not a subscriber has cancelled the video delivery service to train the individual prediction networks.

Some embodiments solve technical challenges that manifest when using individual prediction networks instead of a network that considered all of the subscriber characteristics together to generate one score predicting whether the subscriber will cancel instead of individual dimension scores. Some problems that occur may be that the individual dimension scores may not vary enough to be statistically significant in the retention prediction score and that the individual dimension scores may become correlated, which may overweigh an aspect as an effect on the retention prediction score. Some embodiments may use a variance term to train the models of the individual prediction networks to increase the variance of each score output by the individual prediction networks. The use of the variance term may eliminate the possibility that one of the dimensions would become disabled because the dimension scores tend toward being a constant value. When a constant score for one of the dimensions occurs, then the effect of the dimension on the retention score prediction becomes very small or negligible. Having variance in the scores assures that the score will have a significant effect on the retention prediction score. Maintaining variance when using multiple networks generates more meaningful results. If one network is used, then variance among networks is not a problem.

Another aspect of the training may use a de-correlation term to train the models of the prediction networks to reduce the correlations among the dimension scores. It may not be desirable to have dimension scores that are strongly correlated to each other because that would remove independence of each dimension's contributions to the retention prediction score. The correlation among the outputs of the prediction networks is different from the correlation that may occur within the prediction networks. The internal prediction network correlation may be resolved during training of the parameters of the prediction networks. The correlation of the outputs of the prediction networks are trained in part using the de-correlation term. Finally, the dimension scores may be randomly removed during training to reduce the ability of the model to latch on to a single dimension as being predictive of the retention prediction score. Random removal of the dimensions during training forces the models to learn a shared approach to retention prediction.

System

Figure 1:
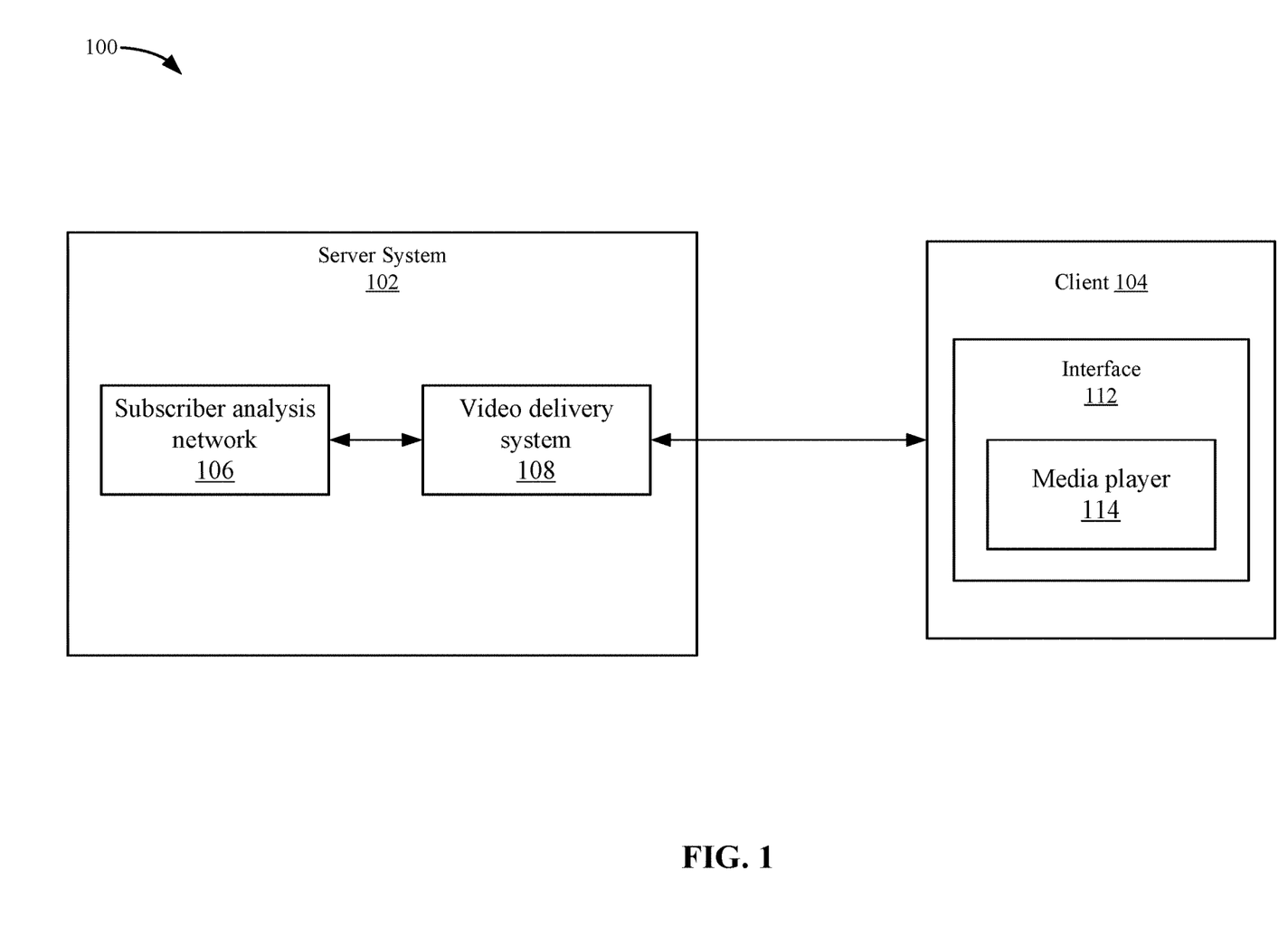
FIG. 1 depicts a simplified system of a method for predicting subscriber health for a video delivery service according to some embodiments.

FIG. 1 depicts a simplified system 100 of a method for predicting subscriber health for a video delivery service according to some embodiments. Subscriber health may indicate a probability that a user will cancel the video delivery service, but may in addition or in the alternative indicate other aspects of subscriber health, such as usage of the service by a subscriber. System 100 includes a server system 102 and client device 104. A subscriber may use client device 104 to access the video delivery service. Although a single client device 104 is described, it will be understood that multiple client devices may be used by one subscriber in addition to multiple subscribers using the video delivery service. Server system 102 may deliver videos to client device 104 using the video delivery service. The videos may be played on a media player 114 that is displayed in interface 112. A subscriber may also perform other actions with respect to interface 112, such as browsing videos, selecting videos to play, stopping the playback of videos, etc.

Server system 102 may record the behavior of the user using interface 112 or media player 114. For example, server system 102 may record how many videos were viewed by each user, at what time, on which device, and which videos they viewed. Also, server system 102 may record how often the user opened the app, what time of day that occurred, how often the user successfully watched something, etc. On the subscription side, server system 102 records when a user requests to cancel the service, how many times they have subscribed and then subsequently cancelled, when they requested to cancel, how long they have been on the service, which subscription plan they have, etc.

To predict whether or not a user will cancel the service, a subscriber analysis network 106 analyzes subscriber features for the subscriber to assess the subscriber health. Subscriber analysis network 106 predicts the probability that a user may cancel the service using a retention prediction score. The retention prediction score is a single overall score for the subscriber that predicts the probability the subscriber will not cancel the service.

The subscriber features may also be isolated into feature dimensions that are individually analyzed by prediction networks to output a prediction score for each dimension. The feature dimensions are split such that individual dimensions can be used to diagnose subscriber health. To group the features into different dimensions, subscriber analysis network 106 analyzes correlations between features. In some embodiments, subscriber analysis network 106 computes a correlation matrix between all features, and then groups the highly correlated features together. The groupings may be fine-tuned based on domain knowledge from the video delivery service. The domain knowledge may be determined based on the video delivery service's historical data, which may indicate which features are correlated.

The dimension scores are then combined to generate the retention prediction score. The isolation of the feature dimensions allows the video delivery service to analyze which individual dimensions may be contributing to the reasons why subscribers may cancel the video delivery service. This provides a more detailed analysis of the prediction.

The isolation of the features may cause some difficulties in determining the retention prediction score, however. For example, separation of the features into different dimensions may result in a variance of the dimension scores for one of the dimensions to be very low. That is, a dimension score may trend toward being a constant value and not vary by a large amount. This may cause this dimension to not meaningfully contribute to the retention prediction score. Some embodiments use a variance parameter to train the model for the dimensions to output scores that vary.

Additionally, individual dimension scores may become correlated, which would not allow each score to represent its respective contribution of its dimension to the retention prediction score. Some embodiments use a de-correlation parameter to train the individual models of the prediction networks to generate dimension scores that are uncorrelated to each other.

Also, some embodiments reduce the ability of the prediction to latch on to a single dimension as being able to determine the retention prediction score. Some embodiments randomly remove dimension scores from prediction networks during training to force the dimensions to contribute equally to the retention prediction score. The above features in the retention prediction process improve the generation of the retention prediction score while allowing the individual feature dimensions to be used to determine the retention prediction score.

Subscriber Analysis Network

Figure 2:
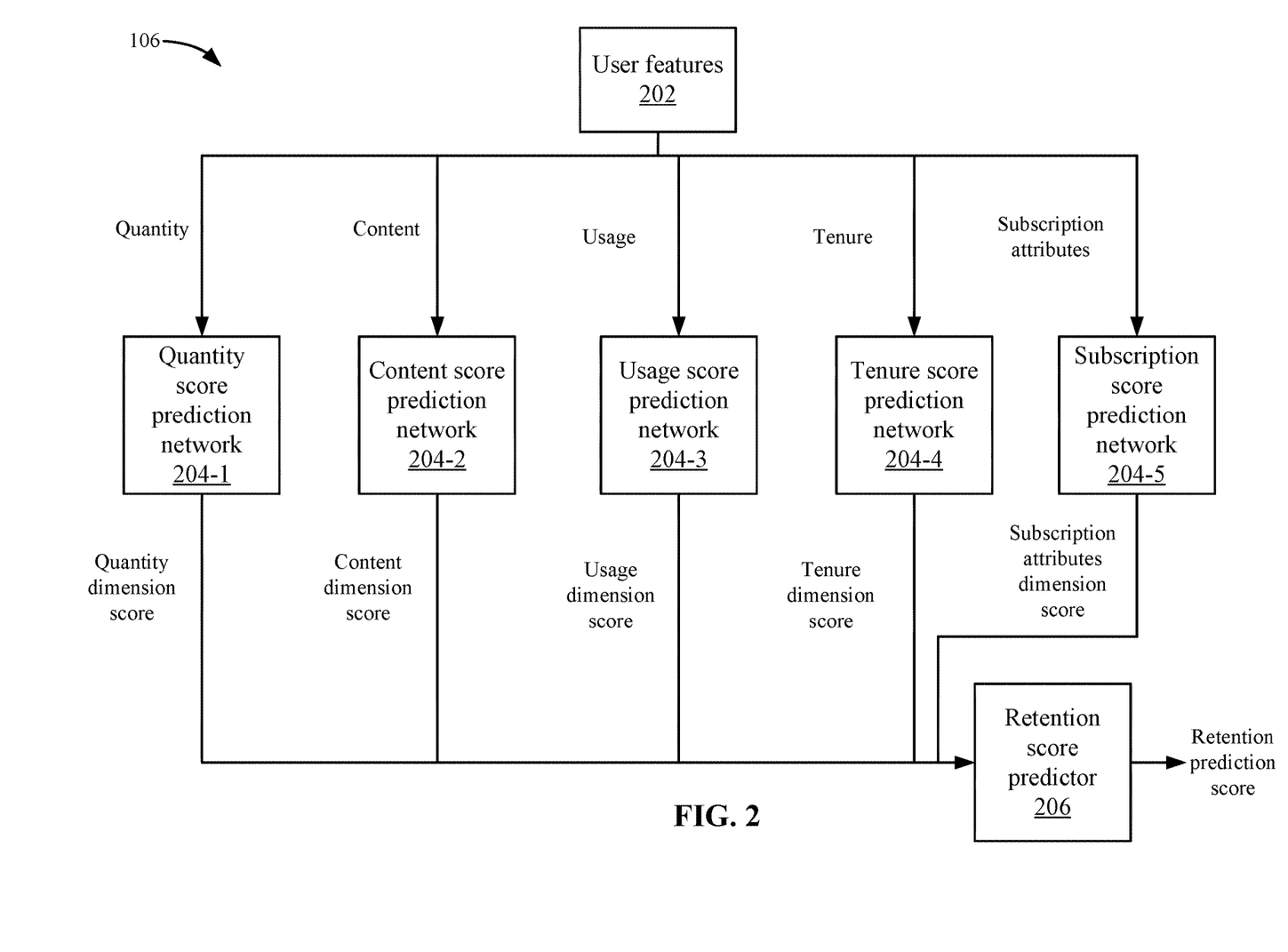
FIG. 2 depicts a more detailed example of a subscriber analysis network according to some embodiments.

FIG. 2 depicts a more detailed example of subscriber analysis network 106 according to some embodiments. Subscriber analysis network 106 may receive user features 202 that describe characteristics of the subscriber using the video delivery service. For example, user features 202 may describe subscriber behavior data while the subscriber is using the video delivery service. Examples of subscriber behavior data may include quantity, content, usage, tenure, and subscription attributes. User features 202 are separated along these dimensions. For example, any features associated with quantity may be grouped in the quantity group.

The quantity dimension may describe the number of videos that are watched by the subscriber. The content dimension may describe the videos that are watched. The usage dimension may describe how often the user is using the video delivery service, such as the number of times the user opens an application or interface for the video delivery service. The tenure dimension is how long the user has been a subscriber of the video delivery service. The subscription attributes include the packages that the user subscribes to, such as a live TV service, or any special add-on channels or services. Although these features are described, other feature dimensions may be used.

The subscriber features for each dimension are input into respective prediction networks 204-1 to 204-5. Each prediction network is trained to predict a score specific to the respective dimension. For example, quantity score prediction network 204-1 predicts a quantity dimension score, content score prediction network 204-2 predicts a content dimension score, usage score prediction network 204-3 predicts a usage dimension score, tenure score prediction network 204-4 predicts a tenure dimension score, and subscription score prediction network 204-5 predicts a subscription attribute dimension score. Each network predicts the retention of each subscriber based on the input features for that dimension. In some embodiments, the output of each prediction network ranges from 0 to 1 in probability units, with a score closer to 1 being less likely that the subscriber will cancel.

The individual dimension scores for each dimension are input into a retention score predictor 206, which combines the scores to generate a retention prediction score. In some embodiments, retention score predictor 206 may multiply the scores for all dimensions together. Multiplying the scores is an approach that may view these scores as independent gates that a subscriber must pass through in order to be retained. For example, the quantity score is the probability that a user consumes enough content to pass the quantity gate. The content score is the probability that a user views enough variety of content to pass the content gate. The usage score is the probability that the subscriber uses the service enough to pass the usage gate. The tenure score is the probability that the user reaches an amount of time subscribing to the service to pass the tenure gate. The subscription attribute score is the probability that the user has added features for the subscription that pass the subscription attributes gate. The product of all these scores is the retention probability for the subscriber, which is the probability that the subscriber passes through all five gates successfully. Other methods of combining the dimension scores will be appreciated, such as a weighted combination.

The video delivery service may have information that a subscriber has cancelled the service. However, a direct correlation from the cancellation decision to which of the one or more of the dimensions that may have most likely contributed to the cancellation is not known. Rather, the video delivery service only knows that a user with certain features has cancelled the service. Accordingly, the video delivery service cannot individually train each prediction network 204 separately because the outcome of each individual dimension score is not known. For example, with the information that a subscriber cancelled the service, the video delivery service cannot train the quantity score prediction network 204-1 with user features from a single dimension. Rather, the video delivery service trains all the prediction networks 204-1 to 204-5 simultaneously against the retention prediction score that is an aggregation of the five dimension scores.

Training Process

Figure 3:
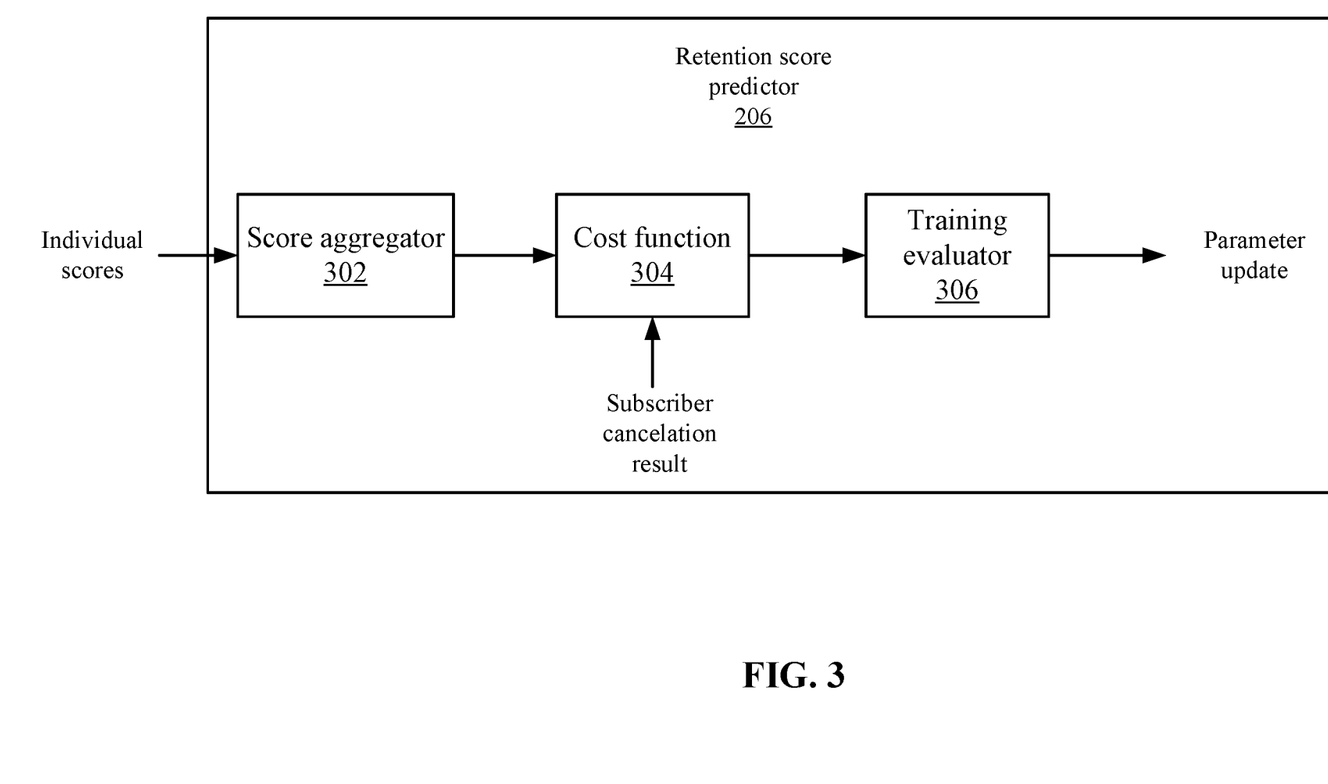
FIG. 3 depicts a more detailed example of the training process according to some embodiments.

FIG. 3 depicts a more detailed example of the training process according to some embodiments. Prediction networks 204 may be initialized with parameter values that are used to generate the dimension scores. For example, the weights of prediction network 204 are initialized with random values. Then, before or during training, the values of the weights are renormalized based on the training data in order to balance the activations to be zero mean and unit variance. Gradual bottlenecking may be used to reduce the dimensionality of the network over multiple layers. Each network is a deep neural network, meaning that it includes many layers connected together. The first layer starts with significantly more elements than features for that particular network. Then, each subsequent layer linearly reduces the number of elements until, at a deep layer, the network reaches a predefined minimum size. Subscriber features in which the result of whether that subscriber had cancelled the service are input into each of the prediction networks, which then output the individual dimension scores.

Retention score predictor 206 receives the individual scores at score aggregator 302, which may combine the scores, such as multiplying the scores together. A cost function 304 then receives the scores and also an indication as to whether or not the subscriber had cancelled the service. Cost function 304 then outputs a cost based on the retention prediction score and the subscriber cancellation result. The cost may measure the accuracy of the prediction based on the subscriber cancellation result. That is, if a higher retention score means the subscriber is less likely to cancel, then a subscriber that did not cancel should get a higher retention prediction score and a subscriber that cancelled should get a lower retention prediction score. The higher retention prediction score may indicate the health of the subscriber, which means a higher score means a higher health whereas a lower score means a lower health. However, it will be understood that the retention prediction score may be configured differently, such as a lower score is a higher health. Cost function 304 may evaluate the retention prediction score based on the subscriber cancellation result. Although a cost function is described, other methods of evaluating the accuracy of the retention prediction score that combine dimension scores together may be used.

Training evaluator 306 may evaluate the output of the cost function and attempt to minimize the cost to increase the accuracy of the prediction. For example, training evaluator 306 may use an algorithm, such as a gradient descent algorithm, to minimize the value of the cost. Based on the evaluation, training evaluator 306 may attempt to adjust the parameters of prediction networks 204 to increase the accuracy of the networks by minimizing the cost.

In the training process, retention score predictor 206 trains prediction networks 204 in ways that provide better prediction results when using individual prediction networks. In one example, cost function 304 attempts to increase the variance of each dimension score. In some embodiments, cost function 304 may add a variance term to the cost function that increases the variance of each score. The increase in the variance may attempt to avoid having the retention prediction score latching on to a small number of dimensions as the primary contributing driver of the retention prediction score. When this occurs, the contribution of other dimension scores is disabled.

During training, some of the dimensions become disabled because the variances of these dimensions become very small, which effectively sets those dimension scores to a constant value. For example, the value for a dimension score may continually be around 0.65 instead of varying from 0.01 to 1.0. When the variance for a dimension score gets very small, then retention score predictor 206 may learn to just ignore those dimensions. That is, training evaluator 306 may adjust the parameters of prediction networks 204 to ignore those dimensions with small variances. However, in some embodiments, because the feature dimensions have been selected by the video delivery service, they are all relevant to the retention prediction score and should not be ignored. Accordingly, cost function 304 forces every dimension score to make a contribution to the overall retention prediction score by pushing the variance of each dimension to a macroscopic value. The macroscopic value is a value that varies enough to have an effect on the retention prediction score. In some embodiments, cost function 304 adds a term to the cost function of:

$$S_2 = \frac{\sigma}{\epsilon + svar},$$

where the variable svar is the computed variance for training data, such as a mini-batch of training data, and the variable $\epsilon$ is a small number to avoid dividing by 0, which may be set to 1e-7. The parameter, $\sigma$, is a hyperparameter of the model that controls the strength of the variance cost. During training, the hyperparameter may be trained to a value that controls the variance of the dimension scores at a desired variance spread. The variance controlling term $S_2$ controls the variance because when the variance (svar) gets small, the denominator gets small and thus the variance controlling term $S_2$ gets very large, representing a large cost, which training evaluator 306 will tend to avoid. That is, training evaluator 306 attempts to minimize the cost from cost function 304 rather than to have a large cost. In some embodiments, each dimension score has its own corresponding variance term to which the dimension score may be added. Cost function 304 may tune a hyper-parameter value for each score dimension, such as using cross validation on a hold-out set.

Cost function 304 also includes a de-correlation term to reduce the correlations between the dimension scores. The de-correlation of the dimension scores allows each dimension score to represent a contribution of its dimension to the retention prediction score for each user. Any information that may lead to bias within one of the dimensions, such as confounders, should not be double-counted in other dimensions. A measure of the amount of double-counting may be the correlation between the dimension scores.

Cost function 304 may minimize the correlation among dimension scores using a de-correlation term in cost function 304 that may cause the training to de-correlate the scores by adding a sum over the off-diagonal elements of the correlation matrix to the cost function. A correlation matrix is used across the five dimension scores. Since there are five dimension scores, the correlation matrix is a 5×5 matrix, yielding 25 values. The diagonal elements of the matrix are very close to the value of one because they represent the correlation of each score with itself. The off-diagonal elements represent the correlation between each pair of scores. For example, if Tenure is in the first column and Content is in the second row, then the off-diagonal value at row=2, column=1 contains the cross-correlation between Tenure and Content. By summing over all the off-diagonal elements, training evaluator 306 is aggregating the cost for any pair of scores to be correlated to minimize this cost.

It is possible that the de-correlation term and the variance svar term conflict with each other. With the svar cost, training evaluator 306 is trying to maximize the variance. In the de-correlation, training evaluator 306 is trying to minimize the correlation. Training evaluator 306 would not try to minimize the on-diagonal elements of the correlation matrix; doing so would conflict with trying to maximize the variance of the dimension scores because they are so closely related mathematically. The cost is multiplied by a de-correlation hyper-parameter that training evaluator 306 tunes via cross-validation techniques. If cost function 304 were to include those on-diagonal terms from the variance calculation in the de-correlation calculation, then cost function 304 would be partly cancelling the attempt to encourage the variance to be large. That is, the de-correlation term and the variable svar term conflict with each other. To avoid the conflict, cost function 304 removes the variance component of the de-correlation term to avoid the clashes.

In some embodiments, the historical data used to train prediction networks 204 may be snapshots of data that span different time periods, such as 30 days prior to the current date. Training evaluator 306 may attempt to predict cancellation requests at different time intervals, such as 30, 60, or 90 days after the current date. In some embodiments, training evaluator 306 may train a separate model for each of these targets; however, a single model may be trained that predicts each of the targets. A multi-class classifier in the prediction networks may be used to predict the multiple time periods of the possible cancellation requests.

Training evaluator 306 may minimize the cost function using various techniques. For example, a stochastic gradient descent may be used; however, other techniques may be used. To minimize the costs during training, training evaluator 306 balances simultaneous training goals to generate the final model for the prediction networks. In some embodiments, training evaluator 306 maximizes the area under the curve (AUC) in training prediction networks 204. For example, training evaluator 306 may minimize log-loss. A key advantage to the approach is that because all five dimension scores feed into retention score predictor 206, the individual scores are guaranteed to be predictive of retention, provided that training evaluator 306 selects models for the prediction networks with a high area under the curve. However, training evaluator 306 attempts to maximize training score variances while minimizing the cross-score variances. Training evaluator 306 selects the trained models for prediction networks 204 that achieve the best combination of all three.

The video delivery service may include both active and inactive users that may be handled differently during the training. For example, inactive users may have less watch activity, which leads to lower usage and quantity values. The inactive users may be subscribers that maintain the subscription but do not watch anything. In this case, the type of content being watched may not be indicative of whether or not this subscriber would cancel. In other cases, when a subscriber does not open the application or browses without watching anything, the usage score may not have much meaning on the cancellation prediction. To address this, during training, retention score predictor 206 may disable the quantity, content, and usage dimension scores for the inactive users. When training the models, training evaluator 306 may include both active subscribers and inactive subscribers, but the dimension scores of the quantity, content, and usage dimensions are not generated or are not taken into account in score aggregator 302 for the inactive subscribers. This allows the models to learn universal behaviors of both active and inactive subscribers, and still produce scores for both inactive and active users. The dropping of the inactive users may produce models that are better able to predict the cancellation for both inactive and active subscribers.

Also, cost function 304 may not include the de-correlation term for the dimension scores for inactive users. One reason is because the scores for the quantity, content, and usage may not be meaningful for inactive users so the de-correlation prediction may be affected by anomalous values. It may be complicated to remove the de-correlation term exactly. Thus, in some embodiments, cost function 304 computes a de-correlation term across all users for the tenure and subscription dimension scores, and then cost function 304 computes a separate de-correlation term across all active users for all five dimension scores. Then, the two separate terms are included in cost function 304.

Cancellation Prediction

Figure 4:
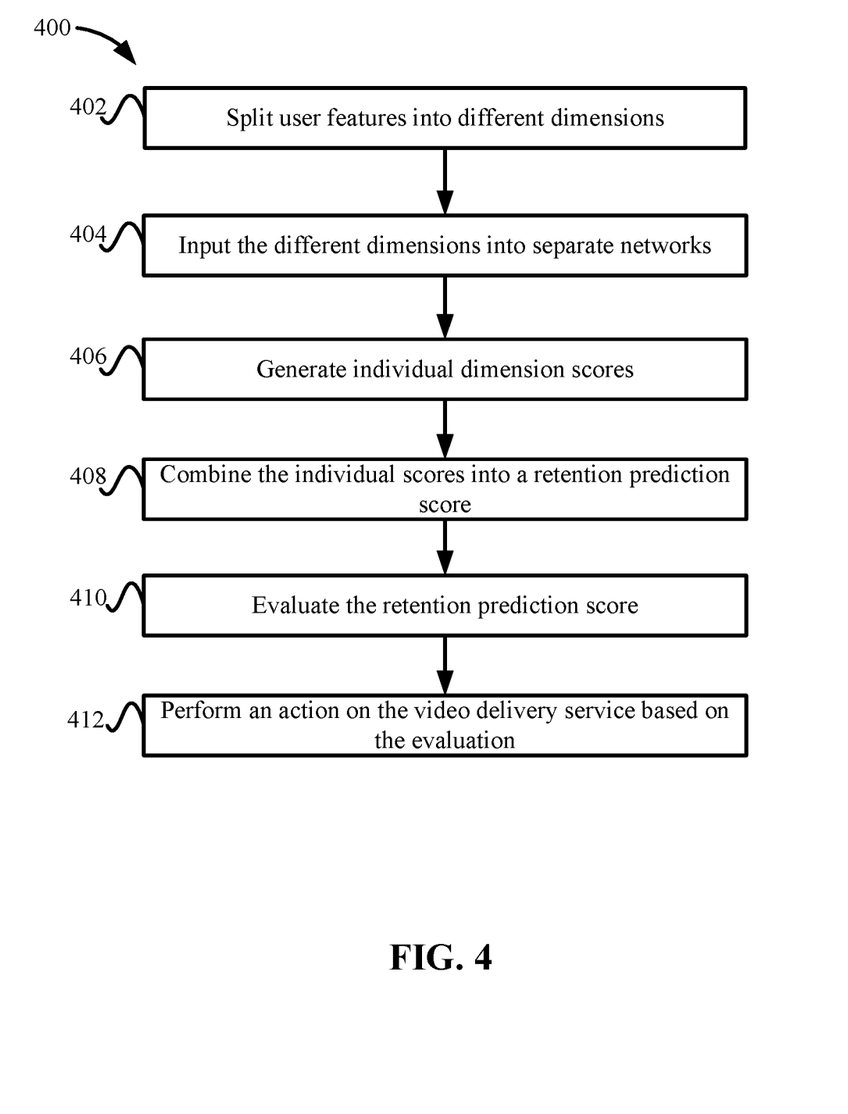
FIG. 4 depicts a simplified flowchart of a method for predicting a probability of cancellation by subscribers according to some embodiments.

After training the prediction networks, subscriber analysis network 106 may then predict the cancellation probability for users. FIG. 4 depicts a simplified flowchart 400 of a method for predicting a probability of cancellation by subscribers according to some embodiments. At 402, user features 202 are split into different dimensions. As discussed above, five different dimensions may be used, but other dimensions may be appreciated.

At 404, the different dimensions for the user features are input into respective prediction networks 204-1 to 204-5. For example, the quantity features are input into quantity score prediction network 204-1, the content features are input into content score prediction network 204-2, and so on. At 406, each prediction network 204 generates individual dimension scores. For example, individual dimension scores for the quantity, content, usage, tenure, and subscription attributes are generated. In some embodiments, dimension scores for inactive users may not be generated for some dimensions as discussed above.

At 408, retention score predictor 206 receives the individual dimension scores and retention score predictor 206 generates a retention prediction score. Retention score predictor 206 may combine the dimension scores using different techniques, such as multiplying the individual dimension scores together.

At 410, retention score predictor 206 evaluates the retention prediction score. For example, the retention prediction score may be within a range, such as from [0, 1] with scores more towards the number 1 being more likely that a user may not cancel and scores more towards the number 0 being more likely a user more will cancel. The evaluation may evaluate the five dimension scores in addition to the retention prediction score. The dimension scores provide more insight into factors that might contribute to cancellation, such as a low usage dimension score may be contributing the most to the low retention prediction score.

At 412, retention score predictor 206 performs an action on the video delivery service based on the evaluation. The action may include adjusting some part of the video delivery service for the subscriber. Retention score predictor 206 may use the scores to identify indicators of cancellation probability both at the subscriber level and also within a group of subscribers. At the group level, retention score predictor 206 may analyze the scores of a group of subscribers together and provide some actions for the group as a whole. Also, retention score predictor 206 may set goals to improve the retention prediction scores of individual subscribers. For example, retention score predictor 206 can identify the symptoms of the risk of a subscriber cancelling using the dimension scores. If certain dimension scores are low, retention score predictor 206 may flag these scores and attempt to improve these scores. For example, different content may be recommended to the user to improve the usage score. Retention score predictor 206 can use the individual dimension scores and retention prediction score to produce more in-depth improvements for subscribers due to the increased insight given by the dimension scores. Retention score predictor 206 may identify points of diminishing return where efforts to retain some subscribers may not be effective at certain score levels.

By experimenting with different interventions and assessing the impact on each dimension score, retention score predictor 206 can build a playbook of interventions that quantifies the expected impact. With the catalog of interventions, retention score predictor 206 can directly impact subscriber retention by deploying the most effective interventions tailored to each subscriber's dimension scores. Without having the individual dimension scores, the impact may not be measured other than knowing that a subscriber would be retained or not retained from an intervention rather than being able to assess the effect of the intervention on the individual dimension scores.

In one example, retention score predictor 206 may select a group of subscribers based on their retention prediction scores. For example, an at-risk group may be the subscribers in the bottom quartile of retention prediction scores. Then, retention score predictor 206 may divide the group randomly into a control group and a treatment group. Retention score predictor 206 may then attempt an intervention for the treatment group. Various actions may be performed, such as sending an e-mail, improving the recommendation engine, adjusting the user interface, or promoting certain content or other change in the video delivery service. The change is deployed to the treatment group and monitored; however, nothing is changed for the control group. Then, at the end of the test, new retention prediction scores are generated for both the treatment group and the control group.

Retention score predictor 206 can then determine the difference between the retention prediction scores of the treatment group and the control group after the test is complete. This test answers the question of whether the impact of the intervention was statistically significant. Retention score predictor 206 can look at the net effect of the intervention to determine if the impact was significant.

Generation of a Dimension Score

Figure 5:
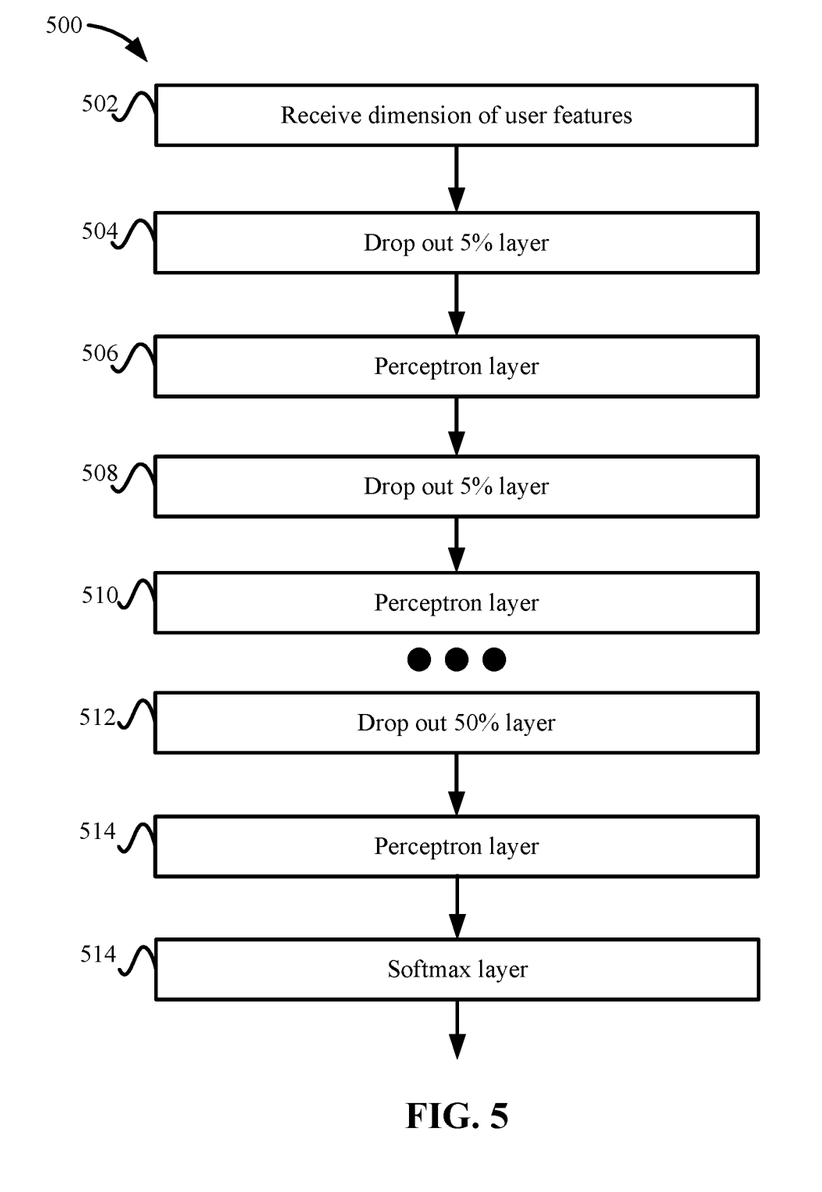
FIG. 5 depicts a simplified example of a prediction network during a training process according to some embodiments.

Each predictor network 204 may have a model that is configured to generate a dimension score. Collectively, all the models of the prediction networks may also be referred to as a model. However, each prediction network may be configured differently to generate a respective dimension score. FIG. 5 depicts a simplified example 500 of a prediction network used during training according to some embodiments. It will be understood that other embodiments of the prediction network may be used. Also, drop out layers are used during training, but are removed when generating the dimension scores. At 502, prediction network 204 receives a dimension of user features. Then, in a drop out layer 504, a certain percentage of features, such as 5%, is dropped out. A certain percentage of features is dropped out to reduce the risk of over-fitting to a particular set of features. This drop out is not used when generating the dimension scores for the prediction.

A perceptron layer 506 includes nodes or neurons that use an activation function to determine whether or not to ignore input data. A node computes a weighted sum over the input features, followed by an addition of a bias, and then that data is modulated by an activation function. The activation function rescales the output of that node in a nonlinear way, providing flexibility in representation of the prediction.

After the perceptron layer 506, a drop out layer 508 performs another drop out of 5%. Another perceptron layer 510 uses an activation function to process the inputs again. This continues for a number of layers. Then, a drop out layer 512 performs a drop out of 50%. The number of weights in each layer ramps down to a fixed floor. In the beginning layers, the input data length is upscaled by using extra perceptron weights in the first layer.

The last layer is a perceptron layer 514 that uses sigmoid activation functions for better stability. In addition to the drop-out, instead of randomly removing neurons from perceptron layers, an entire dimension may be removed during training. This removes some of the score pathways for the dimensions. This is different from regular drop out because instead of zeroing outputs, the outputs are set to a value of one. This causes the score dimension to have no effect on the retention prediction during that iteration of training.

An output layer 516 is an activation function, such as a soft-max activation. Other activation functions may also be used. The inner activation function may be different from the soft-max activation function, except for the last one where a sigmoid activation is used. For example, a scaled exponential linear unit (SELU) activation function may be used in the inner layers that encourage the activations to be self-normalizing. Then, a sigmoid activation is used to stabilize against divergences at the output layer. The sigmoid layer provides extra stabilization because the scores from each of the five models are multiplied together, which causes divergences without the extra stabilization of the sigmoid activation.

Some embodiments use flag fields that indicate the quality of the surrounding data to nodes in the layers. The flags allow the prediction network to learn to ignore input data when it is of dubious quality. One problem with flag fields is that the flags tend to be strongly correlated with each other because if one data channel is suspect, then it is likely that others are as well. The presence of these correlated flags results in an artificial boost in correlation between the data channels in the prediction network. This may be a problem because it makes it difficult to enforce independence between the score dimensions and causes correlation that some embodiments seek to avoid. To mitigate this correlation, each predictor network 204 encodes the flag fields as a random number when the flags indicate that the data is bad and as 0 if the data is good. For example, a threshold may be used to determine whether or not the data is considered bad and whether the data is considered good. A flag is defined as 0 if the data is good and uniformly distributed randomly from −1 to −0.5 and from 0.5 to 1 if the data is bad. This results in a mean 0 flag field and the correlations between the flags are small because of the randomness of the encoding. Although random numbers are fed into the model, the prediction network is able to learn how to interpret the flag fields because any non-0 value for the flag indicates the data is suspect. Specifically, the prediction networks learn how to use the randomized flag fields to apply to the activations of the nodes in the perceptron layer.

CONCLUSION

Accordingly, some embodiments generate individual dimension scores from user features in different dimensions. The use of the different dimension scores allows for a retention score predictor to determine actions to perform for subscribers. To allow for the generation of dimension scores, some embodiments use a variance term in the cost function to ensure that there is variance between the scores and also a de-correlation term that reduces the correlation between the dimension scores. The above improves the prediction process while allowing for use of individual dimension scores.

System

Figure 6:
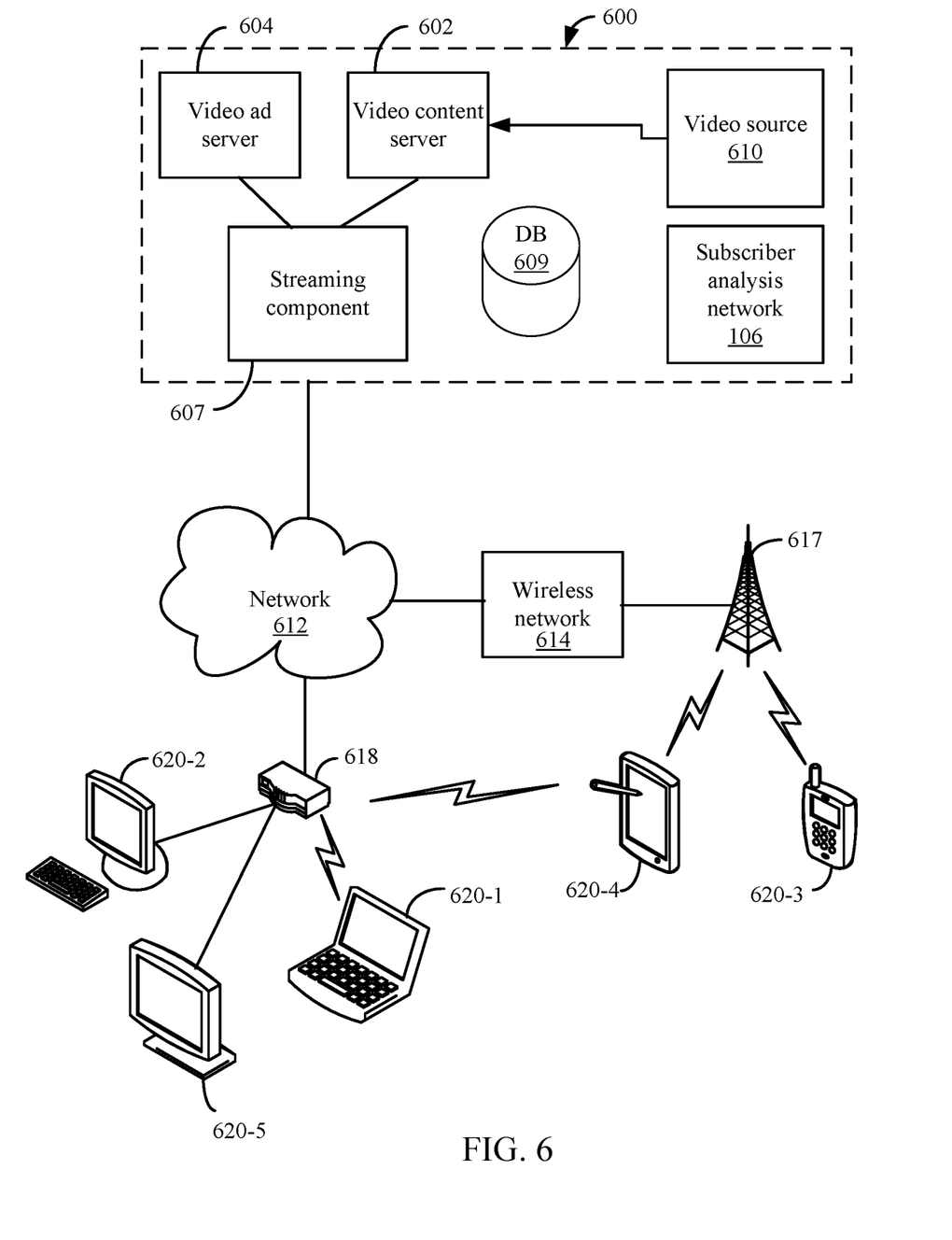
FIG. 6 depicts a video streaming system in communication with multiple client devices via one or more communication networks according to one embodiment.

Features and aspects as disclosed herein may be implemented in conjunction with a video streaming system 600 in communication with multiple client devices via one or more communication networks as shown in FIG. 6. Aspects of the video streaming system 600 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 600, video data may be obtained from one or more sources for example, from a video source 610, for use as input to a video content server 602. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 600 may include one or more computer servers or modules 602, 604, and/or 607 distributed over one or more computers. Each server 602, 604, 607 may include, or may be operatively coupled to, one or more data stores 609, for example databases, indexes, files, or other data structures. A video content server 602 may access a data store (not shown) of various video segments. The video content server 602 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 604 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 600, a public service message, or some other information. The video advertising server 604 may serve the video advertising segments as directed by a user interface controller (not shown).

The video streaming system 600 also may include subscriber analysis network 106.

The video streaming system 600 may further include an integration and streaming component 607 that integrates video content and video advertising into a streaming video segment. For example, streaming component 607 may be a content server or streaming media server. A controller (not shown) may determine the selection or configuration of advertising in the streaming video based on any suitable algorithm or process. The video streaming system 600 may include other modules or units not depicted in FIG. 6, for example, administrative servers, commerce servers, network infrastructure, advertising selection engines, and so forth.

The video streaming system 600 may connect to a data communication network 612. A data communication network 612 may comprise a local area network (LAN), a wide area network (WAN), for example, the Internet, a telephone network, a wireless cellular telecommunications network (WCS) 614, or some combination of these or similar networks.

One or more client devices 620 may be in communication with the video streaming system 600, via the data communication network 612, wireless cellular telecommunications network, and/or another network. Such client devices may include, for example, one or more laptop computers 620-1, desktop computers 620-2, "smart" mobile phones 620-3, tablet devices 620-4, network-enabled televisions 620-5, or combinations thereof, via a router 618 for a LAN, via a base station 617 for a wireless cellular telecommunications network 614, or via some other connection. In operation, such client devices 620 may send and receive data or instructions to the system 600, in response to user input received from user input devices or other input. In response, the system 600 may serve video segments and metadata from the data store 609 responsive to selection of media programs to the client devices 620. Client devices 620 may output the video content from the streaming video segment in a media player using a display screen, projector, or other video output device, and receive user input for interacting with the video content.

Distribution of audio-video data may be implemented from streaming component 607 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 607 may communicate with client device 620 using control messages and data messages to adjust to changing network conditions as the video is played. These control messages can include commands for enabling control functions such as fast forward, fast reverse, pausing, or seeking to a particular part of the file at the client.

Since streaming component 607 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 607 may use TCP-based protocols, such as HTTP and Real Time Messaging Protocol (RTMP). Streaming component 607 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) Live Streaming (HLS) and Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 7:
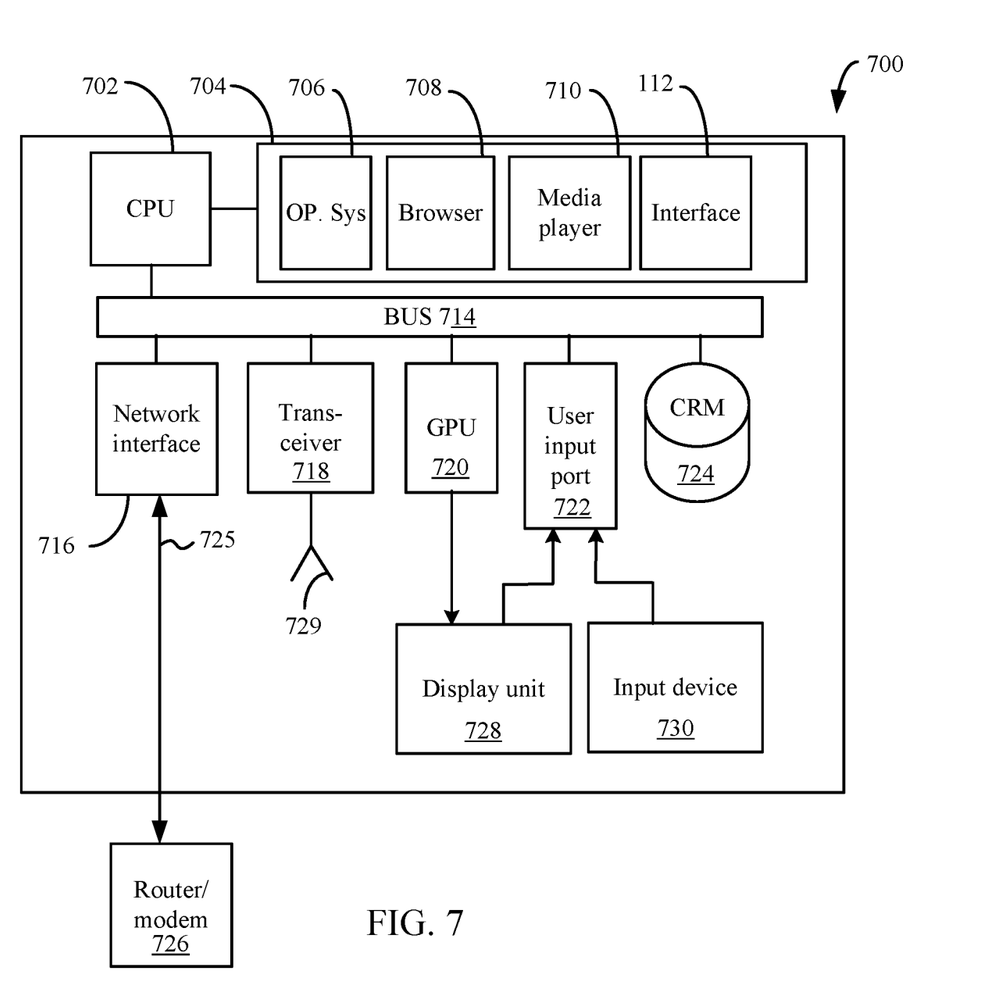
FIG. 7 depicts a diagrammatic view of an apparatus for viewing video content and advertisements.

Referring to FIG. 7, a diagrammatic view of an apparatus 700 for viewing video content and advertisements is illustrated. In selected embodiments, the apparatus 700 may include a processor (CPU) 702 operatively coupled to a processor memory 704, which holds binary-coded functional modules for execution by the processor 702. Such functional modules may include an operating system 706 for handling system functions such as input/output and memory access, a browser 708 to display web pages, and media player 710 for playing video. The modules may further include interface 112. The memory 704 may hold additional modules not shown in FIG. 7, for example modules for performing other operations described elsewhere herein.

A bus 714 or other communication component may support communication of information within the apparatus 700. The processor 702 may be a specialized or dedicated microprocessor configured to perform particular tasks in accordance with the features and aspects disclosed herein by executing machine-readable software code defining the particular tasks. Processor memory 704 (e.g., random access memory (RAM) or other dynamic storage device) may be connected to the bus 714 or directly to the processor 702, and store information and instructions to be executed by a processor 702. The memory 704 may also store temporary variables or other intermediate information during execution of such instructions.

A computer-readable medium in a storage device 724 may be connected to the bus 714 and store static information and instructions for the processor 702; for example, the storage device (CRM) 724 may store the modules 706, 708, 710 and 712 when the apparatus 700 is powered off, from which the modules may be loaded into the processor memory 704 when the apparatus 700 is powered up. The storage device 724 may include a non-transitory computer-readable storage medium holding information, instructions, or some combination thereof, for example instructions that when executed by the processor 702, cause the apparatus 700 to be configured to perform one or more operations of a method as described herein.

A communication interface 716 may also be connected to the bus 714. The communication interface 716 may provide or support two-way data communication between the apparatus 700 and one or more external devices, e.g., the streaming system 600, optionally via a router/modem 726 and a wired or wireless connection. In the alternative, or in addition, the apparatus 700 may include a transceiver 718 connected to an antenna 729, through which the apparatus 700 may communicate wirelessly with a base station for a wireless communication system or with the router/modem 726. In the alternative, the apparatus 700 may communicate with a video streaming system 600 via a local area network, virtual private network, or other network. In another alternative, the apparatus 700 may be incorporated as a module or component of the system 600 and communicate with other components via the bus 714 or by some other modality.

The apparatus 700 may be connected (e.g., via the bus 714 and graphics processing unit 720) to a display unit 728. A display 728 may include any suitable configuration for displaying information to an operator of the apparatus 700. For example, a display 728 may include or utilize a liquid crystal display (LCD), touchscreen LCD (e.g., capacitive display), light emitting diode (LED) display, projector, or other display device to present information to a user of the apparatus 700 in a visual display.

One or more input devices 730 (e.g., an alphanumeric keyboard, microphone, keypad, remote controller, game controller, camera or camera array) may be connected to the bus 714 via a user input port 722 to communicate information and commands to the apparatus 700. In selected embodiments, an input device 730 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 728, for example using a touch sensitive screen. A cursor control device may communicate direction information and command selections to the processor 702 and control cursor movement on the display 728. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
    separating, by a computing device, a plurality of subscriber features generated from a subscriber's interactions with a video delivery service into a plurality of feature dimensions;
    inputting, by the computing device, each of the plurality of feature dimensions into a respective prediction network of a plurality of prediction networks, wherein each prediction network in the plurality of prediction networks is trained to output a respective dimension score;
    outputting, by the computing device, a plurality of dimension scores from the plurality of prediction networks using parameters in the plurality of prediction networks that are trained using a variance term to control a variance of the plurality of feature dimensions and using a de-correlation term to control a correlation of the plurality of feature dimensions, wherein the variance term includes a variance variable representing the variance and a variance parameter that controls a strength of an effect of the variance term on a cost, and wherein the variance term divides the variance parameter by the variance variable;
    combining, by the computing device, the plurality of dimension scores into a retention prediction score; and
    performing, by the computing device, an action on the video delivery service for the subscriber based on the retention score.

2. The method of claim 1, wherein:
    the variance term is added to a cost function that is used to train the plurality of prediction networks, and
    the variance term causes a cost to increase when the variance of a dimension score decreases.

3. The method of claim 1, wherein the variance parameter is tuned to a value for each of the plurality of dimension scores output by the plurality of prediction networks.

4. The method of claim 1, wherein:
    the de-correlation term is added to a cost function that is used to train the plurality of prediction networks, and
    the de-correlation term causes a cost to increase when the correlation between dimension scores increases.

5. The method of claim 1, wherein:
    a first de-correlation term is used for all active subscribers, and
    a second de-correlation term is used for a portion of the plurality of dimensions.

6. The method of claim 1, wherein the plurality of prediction networks are trained by:
   processing a feature dimension using a plurality of drop out layers; and
   processing the feature dimension using a plurality of activation layers.

7. The method of claim 1, wherein outputting the plurality of dimension scores comprises:
   determining whether a flag field for a feature dimension indicates data for the feature dimension is good or bad;
   encoding the flag field as a first number when the data is good; and
   encoding the flag field as a random number when the data is bad.

8. The method of claim 1, wherein training the prediction networks comprises:
   randomly removing a portion of the plurality of dimension scores during the training of the prediction networks.

9. The method of claim 1, wherein training the prediction networks comprises:
   disabling a portion of the plurality of dimension scores during the training of the prediction networks of inactive subscribers.

10. The method of claim 1, wherein the plurality of feature dimensions are generated based on correlations between features.

11. A method comprising:
    separating, by a computing device, a plurality of subscriber features generated from a subscriber's interactions with a video delivery service into a plurality of feature dimensions;
    inputting, by the computing device, each of the plurality of feature dimensions into a respective prediction network of a plurality of prediction networks, wherein each prediction network in the plurality of prediction networks is trained to output a respective dimension score;
    outputting, by the computing device, a plurality of dimension scores from the plurality of prediction networks using parameters in the plurality of prediction networks that are trained using a variance term to control a variance of the plurality of feature dimensions and using a de-correlation term to control a correlation of the plurality of feature dimensions, wherein the de-correlation term adds a sum over off-diagonal elements of a correlation matrix to a cost function that is minimized;
    combining, by the computing device, the plurality of dimension scores into a retention prediction score; and
    performing, by the computing device, an action on the video delivery service for the subscriber based on the retention score.

12. The method of claim 11, wherein the variance term includes a variance variable representing the variance and a variance parameter that controls a strength of an effect of the variance term on the cost.

13. The method of claim 12, wherein the variance term divides the variance parameter by the variance variable.

14. A method comprising:
    separating, by a computing device, a plurality of subscriber features generated from a subscriber's interactions with a video delivery service into a plurality of feature dimensions;
    inputting, by the computing device, each of the plurality of feature dimensions into a respective prediction network of a plurality of prediction networks, wherein each prediction network in the plurality of prediction networks is trained to output a respective dimension score;
    outputting, by the computing device, a plurality of dimension scores from the plurality of prediction networks using parameters in the plurality of prediction networks that are trained using a variance term to control a variance of the plurality of feature dimensions and using a de-correlation term to control a correlation of the plurality of feature dimensions;
    combining, by the computing device, the plurality of dimension scores into a retention prediction score, wherein combining the plurality of dimension scores into the retention prediction score comprises multiplying the plurality of dimension scores to generate the retention prediction score; and
    performing, by the computing device, an action on the video delivery service for the subscriber based on the retention score.

15. A non-transitory computer-readable storage medium containing instructions, that when executed, control a computer system to be configured for:
    separating a plurality of subscriber features generated from a subscriber's interactions with a video delivery service into a plurality of feature dimensions;
    inputting each of the plurality of feature dimensions into a respective prediction network of a plurality of prediction networks, wherein each prediction network in the plurality of prediction networks is trained to output a respective dimension score;
    outputting a plurality of dimension scores from the plurality of prediction networks using parameters in the plurality of prediction networks that are trained using a variance term to control a variance of the plurality of feature dimensions and using a decorrelation term to control a correlation of the plurality of feature dimensions, wherein:
    a first de-correlation term is used for all active subscribers, and
    a second de-correlation term is used for a portion of the plurality of dimensions;
    combining the plurality of dimension scores into a retention prediction score; and
    performing an action on the video delivery service for the subscriber based on the retention score.

16. A method comprising:
    outputting, by a computing device, a plurality of dimension scores from a plurality of prediction networks using a plurality of subscriber features generated from a subscriber's interactions with a video delivery service for a subscriber, wherein outputting the plurality of dimension scores comprises disabling a portion of the plurality of dimension scores during the training of the prediction networks of inactive subscribers;
    combining, by the computing device, the plurality of scores into a retention prediction score;
    evaluating, by the computing device, the retention prediction score and a result of whether the subscriber cancelled the video delivery service, wherein the evaluating uses a variance term to control a variance of the plurality of feature dimensions and a de-correlation term to control a correlation of the plurality of feature dimensions; and
    adjusting, by the computing device, a set of parameters for one or more of the plurality of prediction networks based on the evaluating.

17. The method of claim 16, wherein evaluating comprises:
adding the variance term to a cost function that is used to train the plurality of prediction networks, wherein the variance term causes a cost to increase when the variance of a dimension score decreases.

18. The method of claim 16, wherein evaluating comprises:
adding the de-correlation term to a cost function that is used to train the plurality of prediction networks, wherein the de-correlation term causes a cost to increase when the correlation between dimension scores increases.

19. The method of claim 16, wherein outputting the plurality of dimension scores comprises:
disabling a portion of the plurality of dimension scores during the training of the prediction networks of inactive subscribers.

20. The method of claim 16, wherein the variance term includes a variance variable representing the variance and a variance parameter that controls a strength of an effect of the variance term on the cost.

* * * * *